United States Patent [19]

Rickert

[11] Patent Number: 4,535,354

[45] Date of Patent: Aug. 13, 1985

[54] PROJECTED STEREOSCOPIC PICTURE SEPARATION

[76] Inventor: Glenn E. Rickert, 3429 W. 700 North, Huntington, Ind. 46750

[21] Appl. No.: 478,533

[22] Filed: Mar. 24, 1983

[51] Int. Cl.³ .............................................. H04N 9/54
[52] U.S. Cl. ..................................... 358/88; 358/231; 358/238
[58] Field of Search ..................... 358/88, 3, 231, 237, 358/238, 239

[56] References Cited

U.S. PATENT DOCUMENTS 3,715,619  2/1973  Cotter ................................ 358/231
4,322,743  3/1982  Rickert ................................ 358/88

Primary Examiner—Richard Murray
Attorney, Agent, or Firm—Roger M. Rickert

[57] ABSTRACT

A method is disclosed for projecting a pair of stereoscopic pictures (10, 11 or 23, 27) which can be seen in three dimensions without the observer (22) wearing special spectacles or using other optical aids. The system is adapted to be practical with relatively large screens (18, 30) in very compact forms including use as a table top computer display or in other restricted cabinets. The combination includes a pair of adjacent large projection optics (14, 15 or 28, 29) and a beam splitter (16, 26) capable of both light transmission and light reflection and which is positioned twice in the light path (12, 13) from the source to the observer, and which is particularly suited for compact forms of the device. Also included is a special screen (18, 30) which also has focus power and casts an image (19, 20) of the pair of adjacent projection optics (14, 15) out in space as an adjacent pair of limited viewing areas for an observer's eyes (22) to see the pair of stereoscopic pictures separately, one with each eye, so he can see them as a three dimensional picture without wearing special glasses.

20 Claims, 4 Drawing Figures

PROJECTED STEREOSCOPIC PICTURE SEPARATION

DESCRIPTION

1. Technical Field

This invention relates to stereoscopic picture projection, particularly stereoscopic picture projection which does not require the observer to wear picture separating glasses.

2. Background Art

This invention employs some of the principles set forth in my U.S. Pat. No. 4,322,743 entitled "Bright Picture Projection Including Three Dimensional Projection" which is incorporated by reference herein, and is an improvement thereof. The structure of U.S. Pat. No. 4,322,743, although quite adequate for many uses, when excessively condensed, can, in certain arrangements, show unwanted distortions. The present invention is particularly suited for a very compact distortion free device.

Conventional stereoscopic screen projected pictures including home slide projection and motion picture theater projection require the observer to wear a pair of picture separating glasses. A pair of glasses are frequently used where one lens is red and the other lens is green, with one picture presented on the screen in red and the other in green, so that the stereoscopic pair of pictures are each seen by only the correct eye. Polarized glasses are often used in a like manner.

This requirement for the observer to wear picture separating glasses has seriously limited the use of three dimensional picture projection. The glasses are confusing to an observer if he tries to move about or even look around the room. For some uses such as in a video arcade game room, glasses are impractical because they are prone to damage, loss, or theft by the user.

Among the objects of the invention is the provision of projected three dimensional pictures which do not require the observer to wear picture separating glasses.

Another object of the invention is to provide a system which is suitable for large units and which also can be reduced in size to fit into the confines of small cabinet, including a table top computer, an arcade video game, and a hospsital X-ray picture display.

A further object of the invention is to provide a condensed three dimensional projection system which employs large projection optics of short focal lengths yet which system is essentially free of optical distortions.

Other objects and advantages of the invention will become evident as the following description and drawings are studied.

DISCLOSURE OF THE INVENTION

An image projection system for displaying a three dimensional image is provided by employing a stereoscopic pair of pictures as the picture sources, the sources projected by a pair of large projection optics onto a screen which is not a conventional screen, but which screen is a focusing optic itself. Intermediate to the picture source and the observer is provided a beam splitter capable of both light reflection and light transmission. This beam splitter is positioned in the light pathway from the picture source to the observer so that it affects the light pathway twice, once as a light reflector and once as a light transmitter, and thereby minimize off-axis and other induced distortions in compact forms of the system. Furthermore, it may be located in more than one position. It may be located, for example, between the projection optics and the stereoscopic pictures. Alternatively, it may be located between the observer and the screen optic.

DESCRIPTION OF THE PREFERRED EMBODIMENT

Figure 1:
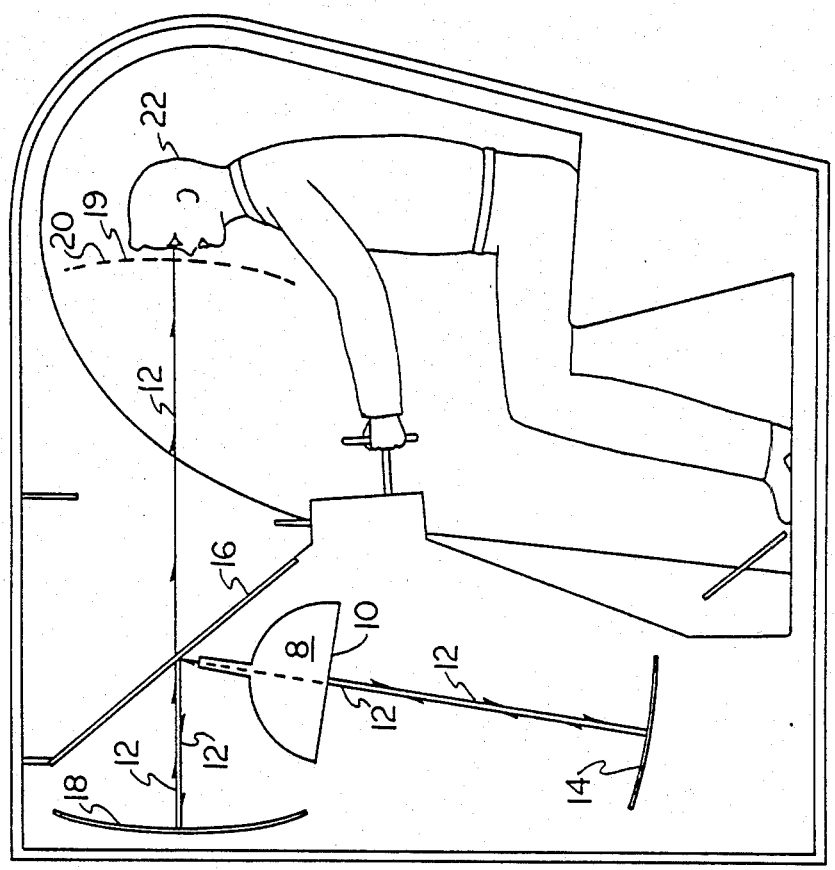
FIG. 1 is a side view of the system employing the beam splitter between the observer and the screen optic.

FIG. 1 illustrates a cathode ray picture tube 8 providing a picture 10 which is reflected and focused by concave mirror projection optic 14 along light pathway 12 to the beam splitter 16 which in turn reflects the light pathway 12 to fall as an image of the picture 10 on or near the concave mirror screen 18. This image is seen by the observer 22 through the beam splitter 16 along the continuing light pathway 12. Because the concave mirror screen 18 is also a focusing optic, it casts an image 19 of the concave projection optic 14 out in space near the observer 22. As a result, the observer can see the picture 10 only while one of his eyes is located in the image 19 area. Outside the area of image 19, the picture 10 cannot be seen.

Figure 2:
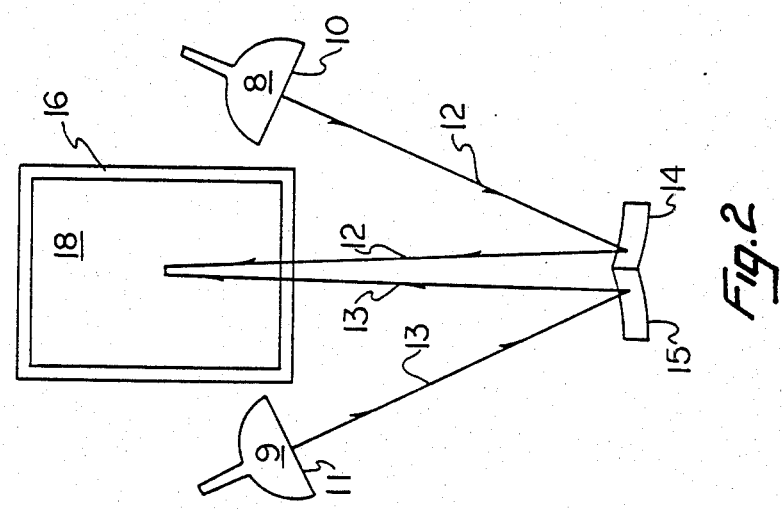
FIG. 2 is a front view of the structure of FIG. 1.

Behind and hidden by cathode ray tube 8 is an adjacent cathode ray tube 9 (see FIGS. 1 and 2). Also not shown in FIG. 1 is a second concave mirror projection optic 15 hidden by concave mirror projection optic 14.

Optic 15 and tube 9 are shown in FIG. 2 which is a front view of the structure in FIG. 1. In FIG. 2, picture 10 of cathode ray tube 8 is reflected and focused by projection optic 14 along light pathway 12 to the beam splitter 16 where pathway 12 is reflected and falls as an image of picture 10 on or near screen 18, and reflected by screen 18 to the observer. Screen 18, being a concave mirror having focus power, focuses an image 19 (see FIG. 1) of projection optic 14, along continuing light pathway 12 through beam splitter 16, and out in space near observer 22. Likewise, picture 11 of cathode ray tube 9 is reflected and focused by optic 15 along light pathway 13 to the beam splitter 16 where pathway 13 is reflected and falls as an image of picture 11 on screen 18, and reflected by screen 18 to the single observer. The system is unique in that the image can be made to fall on the screen 18, in front of screen 18 or rearward of screen 18, and still be seen clearly by the observer.

Screen 18, being a concave mirror having focus power, also focuses an image 20 (see FIG. 1 wherein the image of picture 11 is hidden behind image 19 but indicated by numeral 20) of optic 15, through beam splitter 16, out in space. Because optics 15 and 14 are located adjacent each other, the images of pictures 10 and 11 are focused by screen optic 18 to fall adjacent each other in space near observer 22, as illustrated in FIG. 1 by images 19 and 20, with image 20 hidden behind image 19.

Thus, when the observer positions his eyes, one each in the images 19 and 20 of optics 14 and 15, he is able to see each stereoscopic picture independently and properly.

Figure 3:
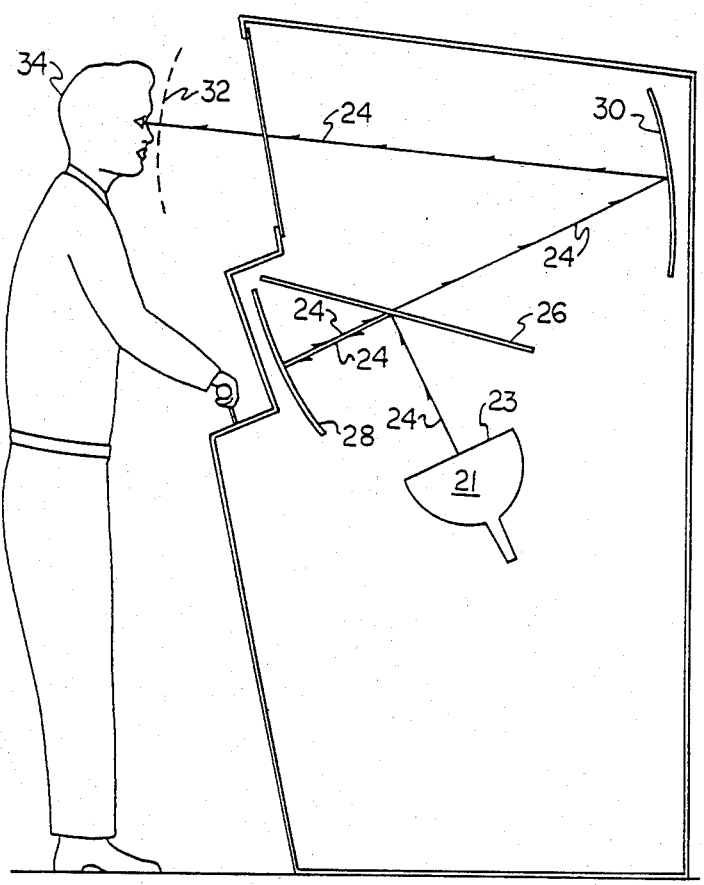
FIG. 3 is a side view of the system employing the beam splitter between the projection optics and the stereoscopic pictures.

Referring to FIG. 3, a cathode ray picture tube 21 provides a picture 23 which is reflected by beam splitter 26 along light pathway 24 to the concave mirror projection optic 28. Projection optic 28 reflects and projects an image from picture 23 and beam splitter 26 along pathway 24 through the beam splitter 26 and toward the concave mirror screen 30. The image on or near the mirror screen 30 is seen by observer 34 along continuing light pathway 24. In addition, the concave mirror screen 30 has focusing power and is adapted to project an image 32 of the projection optic 28 out into space where the single observer is located.

Figure 4:
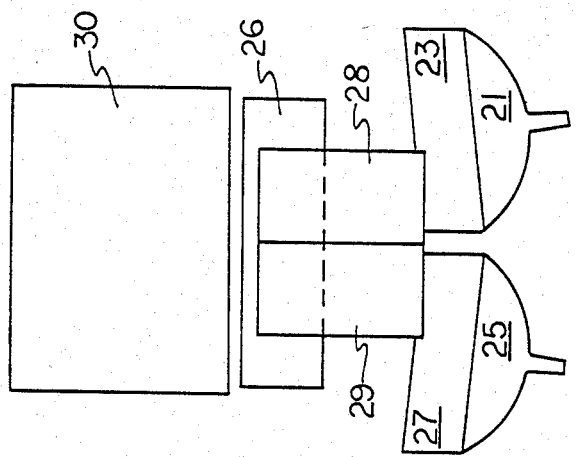
FIG. 4 is a front view of the structure of FIG. 3.

As in FIG. 1, FIG. 3 shows one cathode ray tube 21, but in fact it hides a second cathode ray tube illustrated in FIG. 4 as tube 25. Likewise, concave mirror projection optic 28 of FIG. 3 hides an adjacent concave mirror projection optic shown in FIG. 4 as optic 29.

FIG. 4 is a front view of the structure of FIG. 3, but light pathway 24 is not shown in order to avoid confusion. Cathode ray tubes 21, 25 and respective picture faces 23, 27 are shown below the beam splitter 26 which reflects respective light pathways to the adjacent concave projection optics 28, 29 of FIG. 4. Optic 28 projects an image of picture 23 onto or near the screen 30, and optic 29 projects an image of picture 27 onto or near screen 30. Because screen 30 is a focusing optic, it casts an adjacent pair of images of adjacent projection optics 28, 29 out to the observer's location. The observer 34 can position each eye in one of the two image areas of display 32 and see the stereoscopic pair of pictures 23, 27 each with one eye only, and thus see a three dimensional picture on or near screen 30.

The structure of FIGS. 1 and 2 function in a similar manner to the structure of FIGS. 3 and 4 except for the location of the beam splitter. In the structure of FIGS. 1 and 2, the beam splitter is between the projection optics 14, 15 and the screen 18 as well as between the screen 18 and the observer 22. In the structure of FIGS. 3 and 4, the beam splitter is between the pictures 23, 27 and the projection optics 28, 29 as well as between the projection optics 28, 29 and the screen 30.

By using a beam splitter in either of the positions shown in FIG. 1 and FIG. 3, along with a stereoscopic pair of pictures, a pair of large adjacent projection optics, and a focusing screen optic, essentially distortion free three dimensional pictures can be provided in a very compact form suitable for many applications including an arcade video game, a table top computer display and a hospital X-ray display, and without the use of troublesome picture separating glasses.

The focusing optics are shown and described as concave mirrors, however, other focusing optics may be employed where desired, including refractive lenses, Fresnel lenses, and focusing Fresnel mirrors.

For certain applications it may be desirable to utilize the principles of the present invention in order to present a projected image which appears as a single two dimensional picture, and the single picture can be seen by both eyes of the observer. This can be accomplished by employing only one of the video tubes 8 and 9 (FIG. 2) and one of the projection optics 14 and 15. Utilizing only the tube 8, picture 10, and projection optic 14 of FIG. 1, the observer 22 can place both eyes in the image 19 of projection optic 14 and see picture 10, with both eyes, as a two dimensional picture.

In a similar manner, the structure of FIGS. 3 and 4 can be adapted for two dimensional picture presentation to both eyes of the observer, by eliminating one of the pictures 23, 27 (FIG. 4) and one of the respective projection optics 28, 29. Where the projection optic 28 or 29 is employed to present its respective picture 23 or 27, the observer 34 (FIG. 3) can place both eyes in the single projection optic image and see a two dimensional picture with both eyes.

Although FIGS. 2 and 4 illustrate video tubes displaying two video pictures, one video tube could have both pictures displayed adjacently on the face of the single video tube.

For certain applications, the invention may be modified to allow more than one observer to see the three dimensional scene at the same time. By employing additional and similar pairs of projection optics located laterally to projection optics 14, 15 shown in FIG. 2 or projection optics 28, 29 shown in FIG. 4, additional observers located laterally to the observer 22 of FIG. 1 or observer 34 of FIG. 3, can see the stereoscopic pictures on screen 18 of FIG. 1 and on screen 30 of FIG. 3, respectively, if desired.

The preferred form is described as employing a stereoscopic pair of pictures in a constant fashion on a pair of cathode ray tubes. These streoscopic pictures could be presented alternatively whereby one tube is blank while the other tube presents a picture. This could serve to reduce the size and complexity of the picture generating system. This could be done on two video tubes or on two halves of a single video tube. However accomplished, the alternation rate should be faster than the observers ability to detect flicker. That is, the rate should exceed the observer's critical flicker frequency ability, or nearly so.

For the present invention, any suitable beam splitter may be used which balances reflection verses transmission. The best is, of course, a 50%/50% beam splitter, but more unbalanced proportions can be employed with only a minor sacrifice of brightness. The overall efficiency, that is the total light reflected and transmitted, should be on the order of 80% or better, with 95% to 98% being best. A conventional titanium dioxide beam splitter in the ratio of about 40% to 60%, at about 95% efficiency, provides a satisfactory and efficient part for this invention.

INDUSTRIAL APPLICABILITY

The present invention may be utilized with a table top computer, arcade video games, hospital X-ray picture display, aerial map pictures, projected slide pictures, moving pictures, and numerous other devices for which a three dimensional picture display is desired.

Although preferred embodiments of the invention are shown, other combinations and modifications become obvious once the principles of this invention are understood and such combinations and modifications are considered a part of this invention.

I claim:

1. An improved method of limiting the visibility of stereoscopic pictures on a screen without an observer using special eye glasses wherein at least two stereoscopic pictures comprising first and second pictures are projected onto a screen having light concentrating capability for directing the light of at least two projection optics comprising first and second optics into corresponding first and second limited viewing areas for use by respective eyes of the observer such that the observer can position himself to see the first picture and not the second picture with his first eye and see the second picture and not the first picture with his second eye whereby he can see the picture as a three-dimensional display, the improvement comprising:

projecting the first picture onto said screen by means of said first projection optic and a beam splitter;

projecting the second picture onto said screen by means of said second projection optic and said beam splitter;

whereby a substantially distortion free three-dimensional display is provided the observer.

2. The method in accordance with claim 1, including the step of disposing said beam splitter between said screen and said observer.

3. The method in accordance with claim 1, including the step of disposing said beam splitter between sources of said stereoscopic pictures and said projection optics.

4. The method of claim 1, wherein the repetition rates of both the first and second pictures exceeds the critical flicker frequency ability of the observer.

5. An improved method of providing stereoscopic pictures on a screen without an observer using special eye glasses wherein at least two stereoscopic pictues comprising first and second pictures are projected onto a screen having light concentrating capability for directing the light of at least two projection optics comprising first and second optics into corresponding first and second viewing areas comprising generally vertical first and second viewing strips for use by respective eyes of the observer such that the observer can position himself to see the first picture and not the second picture with his first eye and see the second picture and not the first picture with his second eye whereby he can see the picture as a three-dimensional display, the improvement comprising:

projecting the first picture onto said screen by means of said first projection optic and a beam splitter;

projecting the second picture onto said screen by means of said second projection optic and said beam splitter;

whereby a substantially distortion free three-dimensional display is provided the observer.

6. An improved method for displaying to an observer the image of a picture source in an image projection system wherein projection optic means is intermediate the picture source and the observer, comprising the steps of:

(1) disposing a beam splitter capable of both light transmission and light reflection in the path of the light emitted from the picture source to the observer, (2) positioning said beam splitter to reflect and transmit the light emitted from the picture source to the observer, whereby said system minimizes off-axis induced distortions of the display of said image.

7. The improved method of claim 6, further comprising the step of providing a pair of images from said picture source in said system whereby the projection optic means displays a pair of stereoscopic images to the observer to effect a substantially distortion free three-dimensional display.

8. The improved method of claim 7, further comprising the step of disposing second projection optic means in said system whereby additional displays of said two images are provided.

9. The improved method of claim 7, wherein the projection optic means comprises two projection optic reflectors.

10. The improved method of claim 6, further comprising the step of positioning a screen having light concentrating capability to receive an image cast by the projection optic means to an area near the surface of the screen.

11. The improved method of claim 10, wherein the projection optic means and screen both comprise concave reflectors.

12. The improved method of claim 10, further comprising the steps of providing the image in the form of a stereoscopic image and including another stereoscopic picture source in said system, and disposing said beam splitter in one of two positions comprising (a) the beam splitter disposed between the picture sources and said projection optic means and (b) the beam splitter disposed between said screen and the observer, whereby the system provides to the observer a substantially distortion-free three-dimensional display.

13. In an image projection system for displaying the image of a picture source to an observer and having projection optic means intermediate the source and an observer, the improvement comprising a beam splitter capable of both light transmission and light reflection positioned twice in the light path from the source to the observer, once as a light transmitter and once as a light reflector, to minimize optical distortion.

14. The improvement of claim 13, wherein the projection optic means is the only optical element disposed intermediate the first and second contacts of the projection system light path with the beam splitter.

15. The improvement of claim 13, wherein the projection optic means comprises a concave reflector.

16. The improvement of claim 13, wherein said projection optic means provides a display of a pair of stereoscopic images to the observer, the images from said picture source and transmitted along two light pathways each encountering the beam splitter twice, once effecting light reflection and once effecting light transmission.

17. The improvement of claim 13, further comprising a screen having light concentrating capability and positioned to receive an image cast by the projection optic means to a location near the screen surface.

18. The improvement of claim 13, wherein the projection optic means and the screen both comprise concave reflectors.

19. The improvement of claim 18, wherein the beam splitter is disposed between said screen and said observer.

20. The improvement of claim 18, further comprising second projection optic means positioned adjacent the projection optic means and providing additional displays of the images from said picture source.

* * * * *